No. 770,784. PATENTED SEPT. 27, 1904.
E. H. STEEDMAN.
PRESSURE CONTROL FOR AIR COMPRESSORS.
APPLICATION FILED NOV. 2, 1903.
NO MODEL.

Witnesses.
J. H. Weisbrod.
G. A. Pennington

Inventor:
Edwin H. Steedman.
by Bakewell & Cornwall
att'ys.

No. 770,784. Patented September 27, 1904.

UNITED STATES PATENT OFFICE.

EDWIN H. STEEDMAN, OF ST. LOUIS, MISSOURI.

PRESSURE CONTROL FOR AIR-COMPRESSORS.

SPECIFICATION forming part of Letters Patent No. 770,784, dated September 27, 1904.

Application filed November 2, 1903. Serial No. 179,598. (No model.)

*To all whom it may concern:*

Be it known that I, EDWIN H. STEEDMAN, a citizen of the United States, residing in the city of St. Louis, State of Missouri, have invented a certain new and useful Improvement in Pressure Controls for Air-Compressors, of which the following is a full, clear, and exact description, such as will enable others skilled in the art to which it appertains to make and use the same, reference being had to the accompanying drawings, forming part of this specification, in which—

Figure 1:
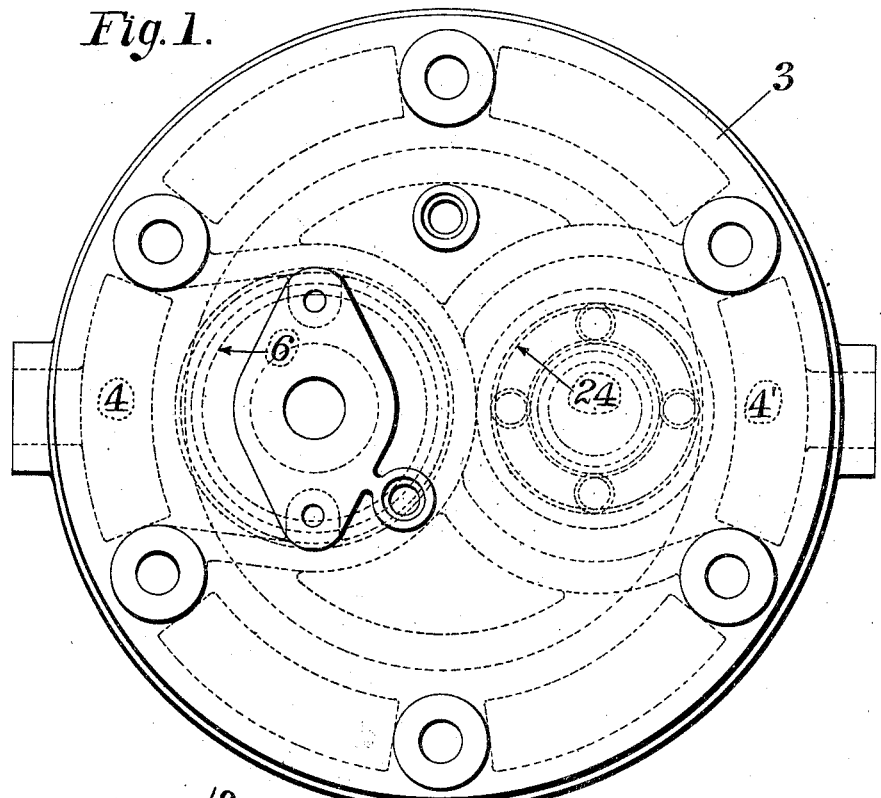
Figure 2:
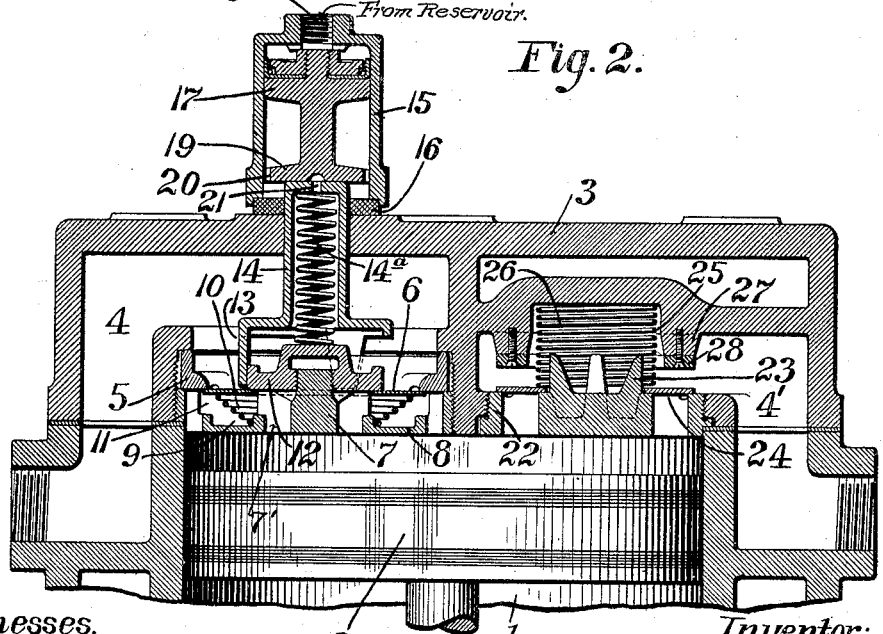

Figure 1 is a plan view of the cylinder-head in which my improved valves are arranged, and Fig. 2 is a sectional view through said head.

This invention relates to a new and useful improvement in pressure controls for air-compressors, the object being to simplify the construction of such pressure controls, making the same cheap and durable and utilizing a few number of parts which are not liable to get out of order.

With these objects in view the invention consists in the construction, arrangement, and combination of the several parts, all as will be hereinafter described, and afterward pointed out in the claims.

In the accompanying drawings I have shown an improved form of air-compressor, and in order that the construction of the suction and discharge valves may be understood I will describe the same here.

1 indicates the cylinder, 2 the piston, and 3 the cylinder-head, which head is formed hollow, the suction-chamber 4 communicating with an opening in the cylinder and the discharge-chamber 4' also communicating with an opening in the cylinder, pipe connections being made with the cylinder in preference to the head, thus enabling the head to be removed without disconnecting the pipes.

A valve-casing is provided which consists of two parts. 5 indicates the seat for the suction-valve, which seat constitutes one part of the casing and is preferably skeleton, with its under surface finished to receive the flat disk valve 6. The central or hub portion of this seat is recessed and threaded to take in a threaded stem 7 on a companion part 7' of the valve-casing, which part 7' is of slightly larger diameter than the valve-seat 5 and threaded into the inner wall of the cylinder-head. This companion portion 7' of the valve-casing is of spider or skeleton form and includes in its construction a concentric ring 8, whose upper surface is provided with an annular groove 9 for receiving the helical spring 10, which holds the valve 6 to its seat. The radial arms extending from the hub or post 7 are recessed at 11 on their upper faces to accommodate the movement of the valve 6 and also guide said valve in its movement.

The construction above described is what is known as a "double-ported" valve, as when said valve is opened by incoming air the spring 10 is compressed in its receiving-groove 9 and the valve 6 is supported on the ring 8, leaving openings for the air to pass around the inner and outer edges of said ring 8.

The central hub portion of the valve-seat 5, before referred to, which is indicated as 12 in the drawings, forms a guide for the prongs 13 of a displacing-thimble 14, which is preferably formed hollow and extends through the outer wall of the cylinder-head, by which it is also guided in its movement. The thimble 14 being made hollow readily accommodates a restoring-spring $14^a$, which may be inserted therein, said spring bearing against the hub of the valve-seat at its lower end. However, this spring $14^a$ may be dispensed with if the helical spring 10, which seats the valve home, is of sufficient strength to also restore the thimble 14 and the piston 17.

15 indicates a governing-cylinder, secured in position on the cylinder-head, a fiber washer 16 being preferably interposed between the cylinder 15 and the cylinder-head, said fiber washer being a non-heat conductor, preventing the heat from the cylinder-head reaching the cylinder 15.

A piston 17 is arranged in the cylinder 15, and a pipe is fitted in the connection 18 so as to conduct air from the reservoir or discharge side of the compressor to a point above the piston, a suitable regulating-valve controlling the admission of such air, (not shown in the drawings,) whereby when the air in the discharge side of the compressor reaches or exceeds a predetermined maximum it will force the piston 17 down and with it the thimble 14, whose arms 13 displace the suction-valve, enabling the compressor to draw in and force out the air through the suction-openings. The lower end of piston 17 is provided with a guiding-head 19, having openings 20 in its periphery to take care of leakage, which leakage escapes through an opening 21 in the upper end of the thimble 14.

The discharge-valve is provided with a portion 22 in the form of a ring having a central portion connected thereto and in the center of which rise guiding-lugs 23, the upper face of said seat receiving and supporting the disk valve 24 at its center and marginal edges. A recess 25 is provided in the cylinder-head for the reception of a spring 26, whose function is to hold the valve 24 to its seat. Around this recess are arranged posts 27 for supporting a ring 28, secured in position by suitable screws entering the posts, said ring acting as a stop and support for the valve 24 when said valve is raised off of its seat. This support prevents the marginal edges of the valve from sagging, as it will be noticed that the spring 26 bears near the inner edge of the valve. This discharge-valve is what is known as a "double-ported" valve, as when said valve is raised off of its seat and supported by the ring 28 the air is not only forced around the outer edge into the discharge-chamber 4', but also passes the inner edge around the guiding-lugs 23 and through the spaces between spring 26 and posts 27 into the chamber 4'.

While I have shown the piston as being in axial alinement with the thimble 14, it is obvious that this arrangement can be changed, and instead of directly applying pressure from the piston to the thimble such pressure or power can be transmitted through the medium of levers, if desired, in which event the piston 17 will be located at a different part of the head, as would be the case in a double-cylinder air-compressor, where one piston is employed to displace both suction-valves.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. In a pressure control for air-compressors, the combination with a suction-valve seat whose hub portion forms a guide, of a thimble having projections disposed around said hub portion to coöperate with the valve, and a spring housed in said thimble and seated against said hub portion; substantially as described.

2. In a pressure control for air-compressors, the combination with a suction-valve, of a thimble for displacing the same, a cylinder in axial alinement with said thimble, a piston in said cylinder, for coöperating with said thimble, said piston having a ported guiding-head to take care of leakage, and said thimble having a port through which said leakage may pass; substantially as described.

3. In a pressure control for air-compressors, the combination with a hollow cylinder-head, of a valve-seat arranged in the inner wall of said cylinder-head, a suction-valve coöperating with said seat, a thimble having displacing projections designed to coöperate with said suction-valve, said thimble extending through an opening in the outer wall of the cylinder-head, a spring housed in said thimble for holding the same normally in an inoperative position, and means for operating said thimble; substantially as described.

4. In a pressure control for air-compressors, a valve-seat having a hub portion providing a guide, a thimble having an elongated barrel, projections on the thimble circumferentially disposed around said hub and contactible with the valve, and a spring seated in the thimble-barrel and bearing against the hub; substantially as described.

5. In a pressure control for air-compressors, a valve-seat having an inner and an outer bearing-ring, an annular valve coöperating with said valve-seat, means on the side of the valve opposite to the valve-seat for limiting the movement of the valve, a thimble, valve-displacing projections carried by the thimble, and means for operating the thimble; substantially as described.

6. In a pressure control for air-compressors, a valve-seat having an inner and an outer bearing-ring, an annular valve coöperating with said valve-seat, means on the side of the valve opposite to the valve-seat for limiting the movement of the valve, a thimble, valve-displacing projections carried by the thimble, means for operating the thimble, and a spring for normally maintaining the thimble in an inoperative position; substantially as described.

7. In a pressure control for air-compressors, a valve-seat having an inner and an outer bearing-ring, an annular valve coöperating with said valve-seat, means on the side of the valve opposite to the valve-seat for limiting the movement of the valve, a thimble, valve-displacing projections carried by the thimble, a thimble-guide carried by the valve-seat, and means for operating the thimble; substantially as described.

8. In a pressure control for air-compressors, a valve-seat having an inner and an outer bearing-ring, an annular valve coöperating with said valve-seat, means on the side of the valve opposite to the valve-seat for limiting the movement of the valve, a thimble projecting beyond the outer wall of the cylinder, valve-displacing projections carried by the thimble, and means for operating the thimble; substantially as described.

9. In a pressure control for air-compressors, a valve-seat having an inner and an outer bearing-ring, an annular valve coöperating with said valve-seat, means on the side of the valve opposite to the valve-seat for limiting the movement of the valve, a thimble projecting beyond the outer wall of the cylinder and having valve-displacing projections, and means for operating the thimble; substantially as described.

10. In a pressure control for air-compressors, a valve-seat having an inner and an outer bearing-ring, an annular valve coöperating with said valve-seat, means on the side of the valve opposite to the valve-seat for limiting the movement of the valve, a thimble projecting beyond the outer wall of the cylinder, a cylinder on the outer wall of the air-compressor and in axial alinement with said thimble, and a thimble-operating piston in the cylinder; substantially as described.

11. In a pressure control for air-compressors, a valve-seat, a suction disk valve coöperating with said valve-seat, means for limiting the movement of the valve, said means being disposed on the side of the valve opposite to the side coöperating with the valve-seat, a thimble having means for operating said valve, and a thimble-operating means; substantially as described.

In testimony whereof I hereunto affix my signature, in the presence of two witnesses, this 26th day of October, 1903.

EDWIN H. STEEDMAN.

Witnesses:
F. R. CORNWALL,
GEORGE BAKEWELL.